Oct. 25, 1949. W. A. C. ANGERMANN 2,485,544
WHEEL TRACTION DEVICE
Filed Nov. 6, 1947
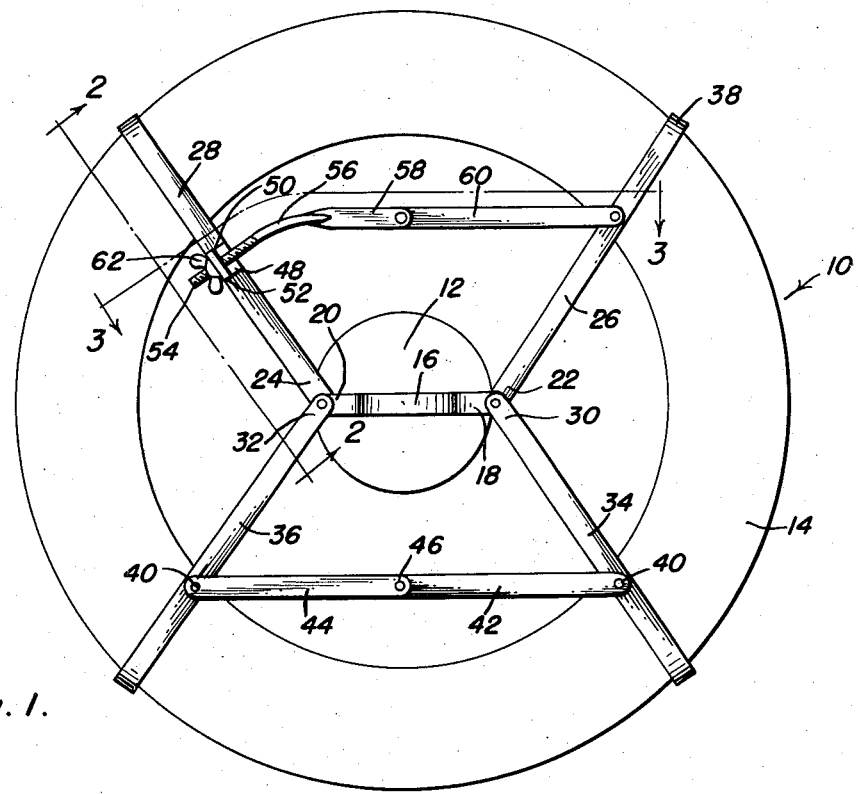
Fig. 1.
Fig. 3.
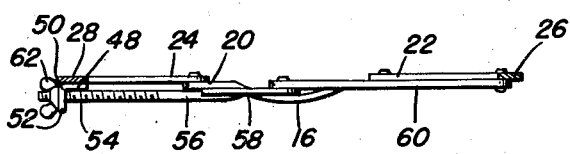
Fig. 2.
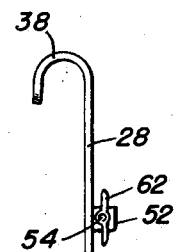
Fig. 4.
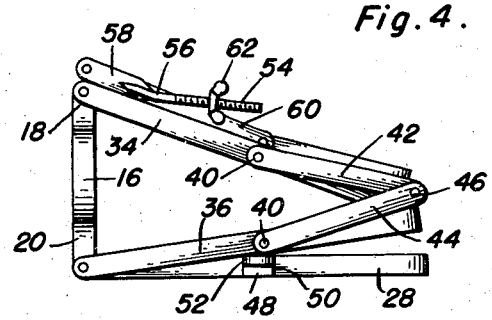
Inventor
Willie A. C. Angermann
By Clarence A. O'Brien
and Harvey B. Jacobson
Attorneys Patented Oct. 25, 1949

2,485,544

UNITED STATES PATENT OFFICE 2,485,544

WHEEL TRACTION DEVICE

Willie A. C. Angermann, Hamilton, Tex., assignor of forty-nine per cent to Luther W. Gardner, Jr., and Frances G. Gardner, Hamilton, Tex.

Application November 6, 1947, Serial No. 784,380

1 Claim. (Cl. 152—225)

This invention relates to new and useful improvements in wheel traction devices and the primary object of the present invention is to provide an attachment for automobiles and tractor wheels so designed as to permit the same to be applied to a wheel from one side without the necessity of having to raise the wheel by a jack or the like.

Another important object of the present invention is the provision of a wheel traction device including novel and improved tightening means whereby the device is applicable for wheels of various sizes.

A further object of the present invention is to provide an attachment for vehicle wheels that includes pivotal parts facilitating the same to be quickly and readily folded into a relatively small and compact article to occupy very little space when not in use.

A still further aim of the present invention is to provide a wheel traction device that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is an elevational view of a wheel looking from the outside thereof, and showing the present invention operatively attached thereon;

Figure 2 is a sectional view taken substantially on the plane of section line 2—2 of Figure 1, and with the wheel removed therefrom;

Figure 3 is a section view taken substantially on the arcuate plane of section line 3—3 of Figure 4, and with the wheel removed therefrom; and Figure 4 is an elevational view of the present invention in a folded position.

Referring now to the drawings in detail, wherein for the purpose of illustration, there is disclosed a preferred embodiment of the present invention, the numeral 10 represents a wheel generally, having a central hub portion 12 and a pneumatic tire 14. This wheel may be of a conventional type commonly employed with motor vehicles or tractors.

Opposing the hub portion 12 of the wheel 10, is a central arcuate link or member 16 having opposite out-turned end portions 18 and 20 to which are pivoted the inner ends 22 and 24 of a pair of upper side members 26 and 28, and the inner ends 30 and 32 of a pair of lower side members 34 and 36.

The outer ends of each of the side members 26, 28, 30 and 32 are turned inwardly to provide arcuate members or hooks 38 that conform to the periphery of the tire 14.

Pivoted at one end, as at 40, to each of the lower side members 34 and 36, is a pair of links 42 and 44, the free ends of which are pivoted as at 46 to each other, to limit the spreading movement of the lower side members relative to each other.

Rigidly secured intermediate the ends of one of the upper side members, for example member 26, is one leg 48 of an angle member 50. The opposite end 52 of the angle member 50 is provided with a suitable aperture that slidably engages the threaded end 54 of an arcuate rod 56. The opposite end of the rod 56 is fixedly secured to a link 58 that is pivoted to a further link 60 pivotally carried by the upper side member 28. A wing nut 62 is receivably engaged on the threaded portion 54 of the rod 56, for selectively adjusting the upper side members relative to each other.

In practical use of the device, the hooks 38 of the lower side members 34 and 36 are so spaced relative to each other and then engage the lower peripheries of the tire 14. The hooks 38 of the upper side members 26 and 28 are then placed over the upper peripheries of the tire 14. The hooks of all of the side members are then adjusted so that the same are equally spaced circumferentially about the tire 14. By then tightening the nut 62 the upper section will tightly engage the upper periphery of the tire and also the lower sections will be simultaneously adjusted to tightly engage the lower periphery of the tire.

Obviously, by the use of such a device, it will not be necessary for the user to raise the wheels as the hooks can be quickly and readily engaged with the tire even though the same may be in a relatively soft surface, such as mud or the like, as the lower side members are so spaced as to avoid that portion of the tire that bears upon the supporting surface when the vehicle is standing.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A wheel traction device comprising a central, arcuate hub receiving member, a first pair of elongated side members pivoted at one of their ends to said hub receiving member, a second pair of elongated side members pivoted at one of their ends to said hub receiving member, a hook provided at the free end of each of said side members, links pivotally connecting said first pair of side members to each other, a further link pivoted at one end to one of said second pair of side members, an externally threaded rod carried by said further link, an angle member carried by the remaining of said second pair of side members and having an aperture for receiving said rod, and a nut receivably engaging said rod and engaging said angle member for selectively positioning said side members relative to a wheel.

WILLIE A. C. ANGERMANN.

REFERENCES CITED

The following references are of record in the file of this patent:

UNITED STATES PATENTS

| Number | Name | Date |
| --- | --- | --- |
| 2,065,810 | Karon | Dec. 29, 1936 |
| 2,315,838 | Bryon | Apr. 6, 1943 |
| 2,423,759 | Edwards | July 8, 1947 |
| 2,426,683 | Harrop | Sept. 2, 1947 |
| 2,445,913 | Grosjean | July 27, 1948 |